(12) United States Patent
Shinohara

(10) Patent No.: US 7,884,870 B2
(45) Date of Patent: Feb. 8, 2011

(54) PHOTOELECTRIC CONVERSION APPARATUS WITH CURRENT LIMITING UNITS TO LIMIT EXCESSIVE CURRENT TO SIGNAL LINES

(75) Inventor: Mahito Shinohara, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 394 days.

(21) Appl. No.: 12/054,554

(22) Filed: Mar. 25, 2008

(65) Prior Publication Data

US 2008/0252764 A1 Oct. 16, 2008

(30) Foreign Application Priority Data

Apr. 11, 2007 (JP) ............... 2007-104213

(51) Int. Cl.
 *H04N 3/14* (2006.01)
 *H04N 5/335* (2006.01)
(52) U.S. Cl. .............. 348/300; 348/302; 348/308
(58) Field of Classification Search ........ 348/308, 348/300
 See application file for complete search history.

(56) References Cited

U.S. PATENT DOCUMENTS

| | | | |
|---|---|---|---|
| 5,280,358 A | 1/1994 | Yushiya et al. | 358/213.17 |
| 6,111,606 A * | 8/2000 | Ikeda | 348/241 |
| 6,704,050 B1 * | 3/2004 | Washkurak et al. | 348/294 |
| 6,828,601 B2 | 12/2004 | Shinohara | 257/183.1 |
| 7,141,775 B2 * | 11/2006 | Koseki | 250/208.1 |
| 7,250,970 B2 | 7/2007 | Shinohara | 348/308 |
| 7,652,702 B2 * | 1/2010 | Murakami et al. | 348/294 |
| 7,755,688 B2 * | 7/2010 | Hatano et al. | 348/300 |
| 2005/0121519 A1 | 6/2005 | Shinohara | 235/454 |
| 2005/0253945 A1 | 11/2005 | Shinohara | 348/300 |
| 2005/0253946 A1 | 11/2005 | Shinohara | 348/300 |

FOREIGN PATENT DOCUMENTS

| | | |
|---|---|---|
| JP | 6-334810 | 12/1994 |
| JP | 8-18866 | 1/1996 |
| JP | 9-27883 | 1/1997 |
| JP | 2000-287133 A | 10/2000 |
| JP | 2002-543683 A | 12/2002 |
| JP | 2003-51989 A | 2/2003 |
| JP | 2003-163843 A | 6/2003 |
| JP | 2005-217704 A | 8/2005 |
| JP | 2006-186467 A | 7/2006 |

* cited by examiner

*Primary Examiner*—Ngoc-Yen T Vu
(74) *Attorney, Agent, or Firm*—Fitzpatrick, Cella, Harper & Scinto

(57) ABSTRACT

A photoelectric conversion apparatus is disclosed. A photoelectric conversion apparatus includes a pixel array in which pixels including photoelectric conversion units are arrayed in a row direction and a column direction, a plurality of first column signal lines which are electrically connected to the pixels arrayed in the pixel array in the column direction, respectively, a plurality of column amplification units which amplify signals provided via the plurality of the first column signal lines, respectively, a power supply line which provides a power supply voltage to the plurality of column amplification units, and a plurality of second column signal lines which are electrically connected to output sides of the plurality of column amplification units, respectively. Each column amplification unit includes a current limiting unit which limits the flow of an excessive current to each of the plurality of second column signal lines.

5 Claims, 10 Drawing Sheets

F I G. 10
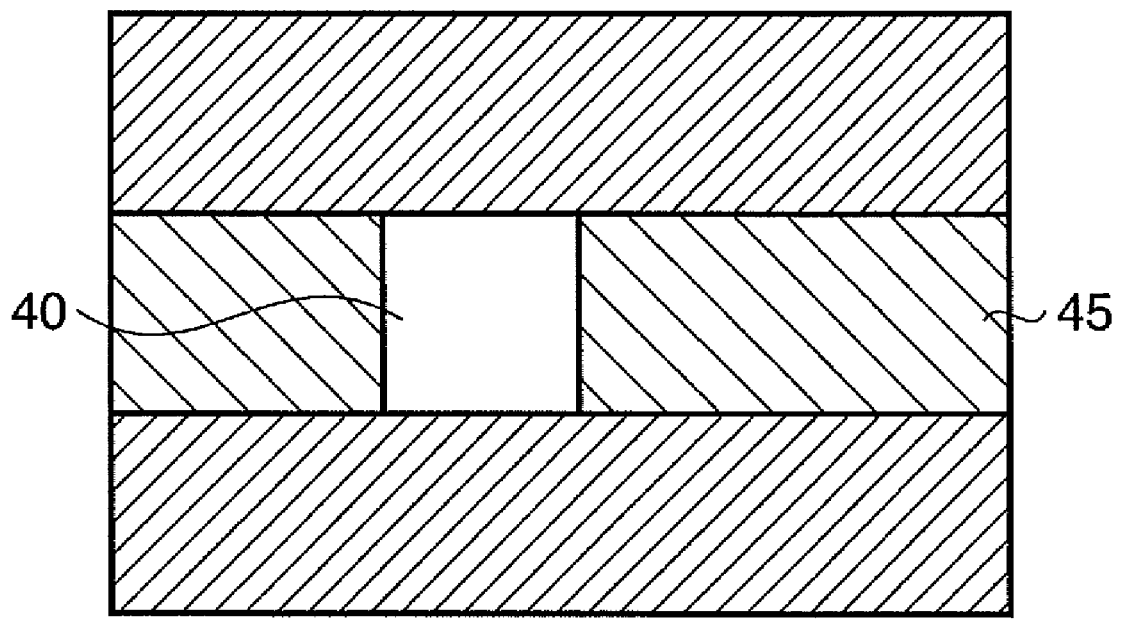

PHOTOELECTRIC CONVERSION APPARATUS WITH CURRENT LIMITING UNITS TO LIMIT EXCESSIVE CURRENT TO SIGNAL LINES

BACKGROUND OF THE INVENTION

1. Field of the Invention

The present invention relates to a photoelectric conversion apparatus and an image capturing system.

2. Description of the Related Art

A so-called amplification type photoelectric conversion apparatus having the merits of user friendliness, low power consumption, and the like has been developed. In this amplification type photoelectric conversion apparatus, fixed pattern noise (to be referred to as FPN hereinafter) caused by threshold variations of amplification transistors for amplifying signals from the respective pixels mixes in an optical signal. Japanese Patent Laid-Open No. 2003-051989 therefore proposes a technique of suppressing FPN by using a readout circuit for performing correlation double sampling (to be referred to as CDS hereinafter) which computes the difference between an optical signal and a reset signal.

Japanese Patent Laid-Open No. 2003-051989 therefore proposes a technique of providing a column amplification unit for each column signal line, amplifying an optical signal and a reset signal by using each column amplification unit, and performing CDS processing for the amplified signals by using a readout circuit. This makes it possible to suppress FPN by effectively performing CDS processing.

In a photoelectric conversion apparatus 100 disclosed in Japanese Patent Laid-Open No. 2003-051989, in some cases, no light enters a pixel 1 on the right column of a 2×2 pixel array PA, and high-luminance light enters a pixel 1 on the left column of the array, as shown in FIG. 7. At this time, the amount of electric charge (signal) stored in a photoelectric conversion unit 1a of the pixel 1 on the right column becomes zero, and the amount of electric charge (signal) stored in a photoelectric conversion unit 1a of the pixel 1 on the left column becomes large. The signal output from the pixel 1 on the right column to a column amplification unit (column amplifier) 106 via a first column signal line L101 becomes almost zero. In contrast, the signal output from the pixel 1 on the left column to a column amplification unit 106 via a first column signal line L101 becomes a large value.

As shown in FIG. 8, in the column amplification unit 106 for the pixel 1 on the right column, the zero signal is input from the pixel 1 to an input terminal 26 via the first column signal line L101 and a capacitor 33, and a reference signal (reference voltage Vref) is input to an input terminal 25. A differential amplifier 24 amplifies the difference between the two signals. The differential signal generated by amplifying the difference is input to an output buffer unit 28 functioning as a source follower. The output buffer unit 28 outputs a signal corresponding to the differential signal from an output terminal 29 to a second column signal line L102. At this time, no large current (excessive current) flows between the drain and source of a transistor Tr of the output buffer unit 28.

In contrast, as shown in FIG. 8, in the column amplification unit 106 for the pixel 1 on the left column, a high-level signal is input from the pixel 1 to the input terminal 26 via the first column signal line L101, and a reference signal (reference voltage Vref) is input to the input terminal 25. The differential amplifier 24 amplifies the difference between the two signals. The differential signal generated by amplifying the difference is input to the output buffer unit 28 functioning as a source follower. The output buffer unit 28 outputs a signal corresponding to the differential signal from the output terminal 29 to the second column signal line L102. At this time, the load of a current for charging holding capacitors 7 and 8 of a readout circuit 5 electrically connected to the second column signal line L102 increases, and hence a large current (excessive current) flows between the drain and source of the transistor Tr of the output buffer unit 28. As a consequence, a large current (excessive current) also flows in a power supply line L103.

With this operation, as shown in FIG. 9, the interconnection resistance of the power supply line L103 temporarily decreases the potential of the power supply line L103 at a timing T1 at which the holding capacitors 7 and 8 of the readout circuit 5 electrically connected to the second column signal line L102 start charging up. At a timing T2 at which the holding capacitors 7 and 8 finish charging up, the potential of the power supply line L103 is still lower than a potential VDD. Note that the potential VDD is the power supply potential of a supply source.

The column amplification unit 106 on the right column shares the power supply line L103 with the column amplification unit 106 on the left column (see FIG. 7), and hence outputs a signal different from a zero signal, which should output a zero signal, due to the influence of the temporal potential variation of the power supply line L103.

In an image corresponding to the image signal obtained in this manner, as shown in FIG. 10, an alias (horizontal smear) occurs in an area 45 horizontally adjacent to a high-brightness object 40.

SUMMARY OF THE INVENTION

The present invention provides a photoelectric conversion apparatus and image capturing system which can reduce horizontal smear.

According to the first aspect of the present invention, there is provided a photoelectric conversion apparatus comprising: a pixel array in which pixels including photoelectric conversion units are arrayed in a row direction and a column direction; a plurality of first column signal lines which are electrically connected to the pixels arrayed in the pixel array in the column directions respectively; a plurality of column amplification units which amplify signals provided via the plurality of first column signal lines, respectively; a power supply line which provides a power supply voltage to the plurality of column amplification units; and a plurality of second column signal lines which are electrically connected to output sides of the plurality of column amplification units, respectively, each of the plurality of column amplification units including a current limiting unit which limits flow of an excessive current to each of the plurality of second column signal lines.

According to the second aspect of the present invention, there is provided an image capturing system comprising: a photoelectric conversion apparatus defined above; an optical system which forms light into an image on the photoelectric conversion apparatus; and a signal processing unit which generates image data by processing a signal output from the photoelectric conversion apparatus.

According to the present invention, it is possible to reduce horizontal smear.

Further features of the present invention will become apparent from the following description of exemplary embodiments with reference to the attached drawings.

BRIEF DESCRIPTION OF THE DRAWINGS

FIG. 10 is a view for explaining the problem to be solved by the present invention.

DESCRIPTION OF THE EMBODIMENTS

Figure 1:
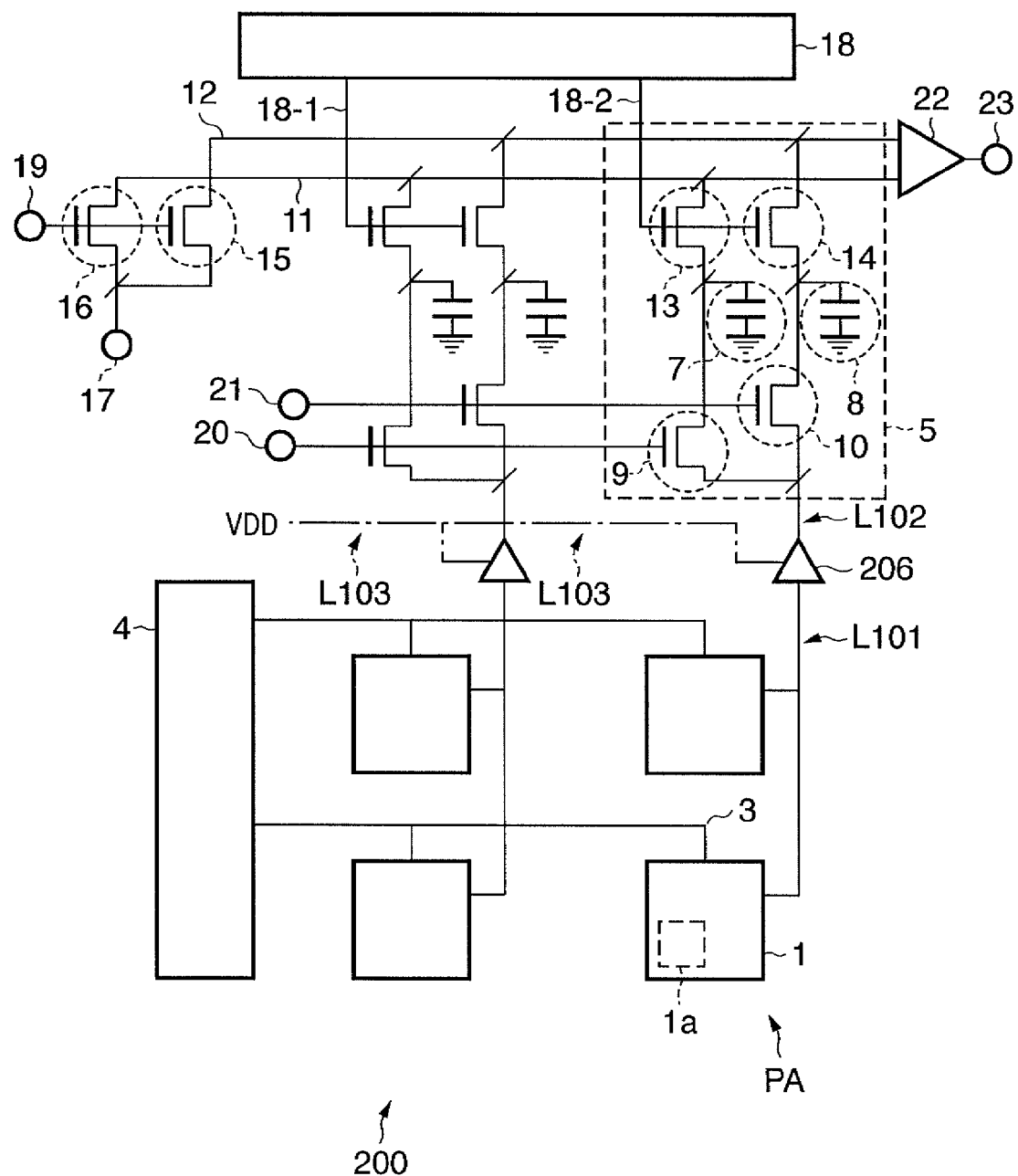
FIG. 1 is a diagram showing the arrangement of a photoelectric conversion apparatus according to the first embodiment of the present invention.

A photoelectric conversion apparatus 200 according to the first embodiment of the present invention will be described with reference to FIG. 1. FIG. 1 is a diagram showing the arrangement of the photoelectric conversion apparatus 200 according to the first embodiment of the present invention.

The photoelectric conversion apparatus 200 comprises the following constituent elements.

Reference symbol PA denotes a pixel array having pixels (unit pixels) 1 arrayed in the row and column directions. The pixel 1 includes a photoelectric conversion unit 1a. The photoelectric conversion unit 1a is, for example, a photodiode. The pixel array PA has the pixels 1 arrayed in the row and column directions. For simplicity, each pixel array PA comprises 2×2 pixels. The pixel 1 can be of any system. Assume, however, that in this case, the pixel 1 is of a general type that outputs a reset signal of a reset level, and an optical signal with a signal level superimposed on the reset level. For the sake of convenience, assume that in a 2×2 pixel array, the column located on the left side on the drawing surface will be referred to as the "left column", and the column located on the right side on the drawing surface will be referred to as the "right column".

Reference symbol L101 denotes each of first column signal lines. The first column signal line L101 is electrically connected to the pixels 1 arrayed in the column direction in the pixel array PA. Reference numeral 3 denotes a pixel drive line; 4, a vertical scanning circuit which selects and drives a pixel row to be driven via the pixel drive line 3; and 206, each of column amplification units (column amplifiers). The column amplification unit 206 is electrically connected to the first column signal line L101, and amplifies a signal provided via the first column signal line L101.

Reference symbol L103 denotes a power supply line for providing a power supply voltage to the plurality of column amplification units 206. The power supply line L103 is commonly electrically connected to the column amplification unit 206 on the left column and the column amplification unit 206 on the right column, and provides a power supply voltage VDD to the column amplification unit 206 on the left column and the column amplification unit 206 on the right column. Reference symbol L102 denotes each of second column signal lines. The second column signal line L102 is electrically connected to the output side of the column amplification unit 206.

Reference numeral 5 denotes a readout circuit for reading out the signal output from the pixel 1. The readout circuit 5 is electrically connected to the second column signal line L102, and holds the signal output from the column amplification unit 206. Reference numeral 11 denotes a noise output line to which the reset signal output held in a holding capacitor 7 (to be described later) is supplied; and 12, a signal output line to which the optical signal output held in a holding capacitor 8 is supplied.

Reference numeral 15 denotes a noise output line reset MOS transistor for resetting the potential of the noise output line 11; 16, a signal output line reset MOS transistor for resetting the potential of the signal output line 12; and 17, a power supply terminal for providing a reset voltage to the reset MOS transistors 15 and 16.

Reference numeral 18 denotes a horizontal scanning circuit which sequentially selects the holding capacitors 7 and 8 on each column; and 18-1, a signal line for selecting the left column. The signal line 18-1 is electrically connected to switching MOS transistors 13 and 14 on the left column. That is, the horizontal scanning circuit 18 supplies outputs from the holding capacitors 7 and 8 sequentially selected on the left column to the input terminals of a differential amplifier 22 via the noise output line 11 and the signal output line 12, respectively. Reference numeral 18-2 denotes a signal line for selecting the right column. The signal line 18-2 is electrically connected to switching MOS transistors 13 and 14 on the right column. That is, the horizontal scanning circuit 18 supplies outputs from the holding capacitors 7 and 8 sequentially selected on the right column to the input terminals of the differential amplifier 22 via the noise output line 11 and the signal output line 12, respectively.

Reference numeral 19 denotes a pulse supply terminal for supplying pulses to the gates of the reset MOS transistors 15 and 16; 20, a pulse supply terminal for supplying a pulse to the gate of the switching MOS transistor 9; and 21, a pulse supply terminal for supplying a pulse to the gate of a switching MOS transistor 10.

Reference numeral 22 denotes a differential amplifier which amplifies and outputs the difference between a voltage (noise signal) from the noise output line 11 and a voltage (optical signal) from the signal output line 12. That is, the horizontal scanning circuit 18 supplies outputs from the sequentially selected holding capacitors 7 and 8 to the input terminals of the differential amplifier 22 via the noise output line 11 and the signal output line 12, respectively. As a consequence, a signal from which the reset level of the pixel is removed is output from a terminal 23. At this time, the offsets of the column amplification unit 206 are also accumulated in the holding capacitors 7 and 8 in the same manner, and hence the offsets of the column amplification unit 206 are also removed. Reference numeral 23 denotes the output terminal of the differential amplifier 22.

The arrangement of the readout circuit 5 will be described next with reference to FIG. 1.

The readout circuit 5 includes the following constituent elements.

Reference numeral 7 denotes a holding capacitor for holding a reset signal output from the pixel 1. That is, the column amplification unit 206 amplifies a reset signal from the pixel 1 on the row selected by the vertical scanning circuit 4. The amplified reset signal is stored in the holding capacitor 7. Reference numeral 8 denotes a holding capacitor for holding an optical signal output from the pixel 1. That is, the column amplification unit 206 amplifies an optical signal from the pixel 1 on the row selected by the vertical scanning circuit 4. The amplified optical signal is stored in the holding capacitor 8.

Reference numeral 9 denotes a switching MOS transistor for electrically connecting/disconnecting the second column signal line L102 and the holding capacitor 7; 10, a switching MOS transistor for electrically connecting/disconnecting the second column signal line L102 and the holding capacitor 8; 13, a switching MOS transistor for electrically connecting/disconnecting the holding capacitor 7 and the noise output line 11; and 14, a switching MOS transistor for electrically connecting/disconnecting the holding capacitor 8 and the signal output line 12.

Figure 2:
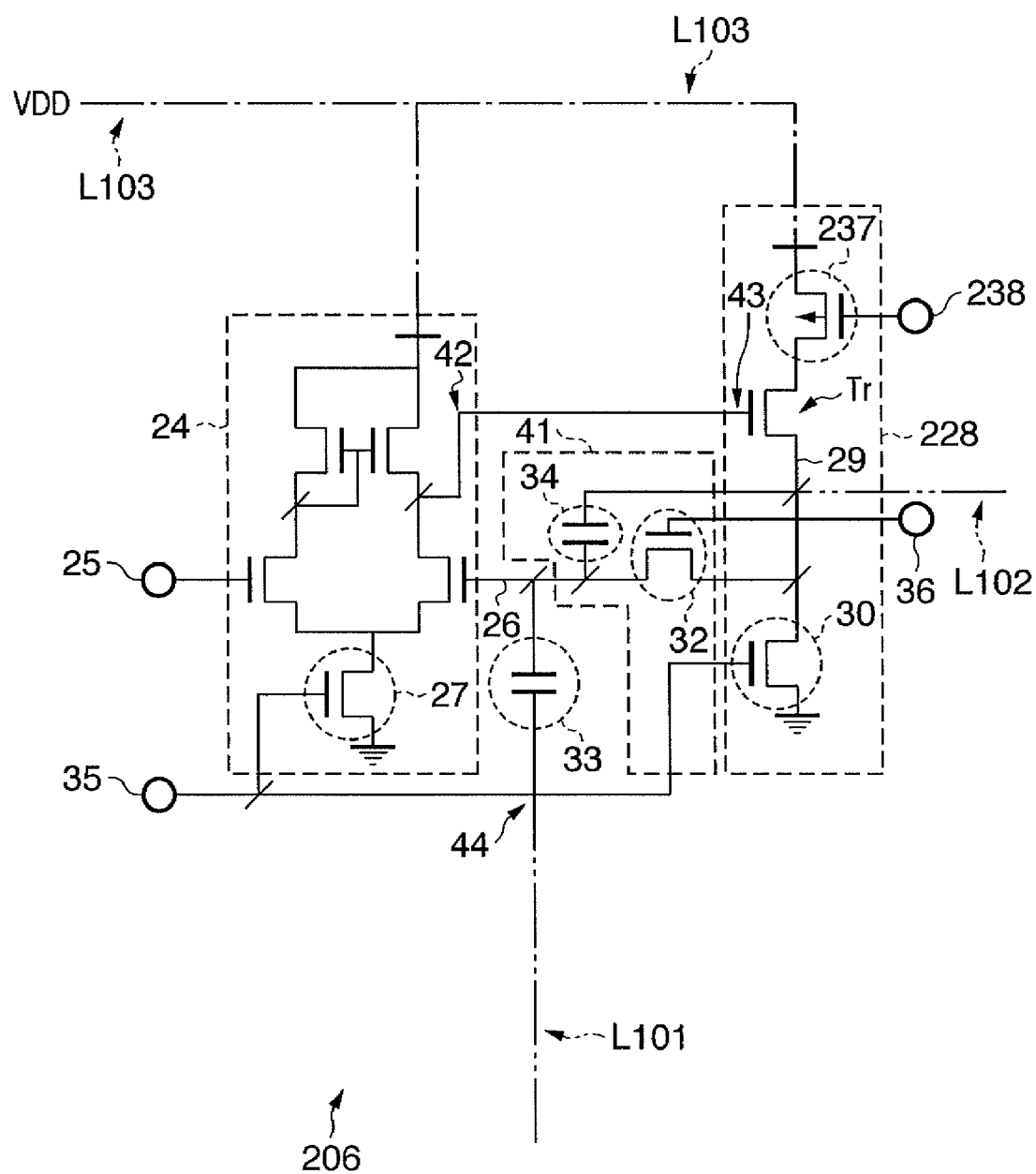
FIG. 2 is an equivalent circuit diagram showing the arrangement of a column amplification unit.

The column amplification unit 206 will be described next with reference to FIG. 2. FIG. 2 is an equivalent circuit diagram showing the arrangement of the column amplification unit 206.

The column amplification unit 206 includes a differential amplifier 24, output buffer unit 228, and feedback unit 41.

The differential amplifier 24 includes the following constituent elements.

Reference numeral 25 denotes a (+) input terminal to which the reference voltage Vref is provided; and 26, a (−) input terminal which is electrically connected to the feedback unit 41 and is also electrically connected to a terminal 44 via a capacitor 33. One electrode of the capacitor 33 is electrically connected to the (−) input terminal 26, and the other electrode is electrically connected to the terminal 44. Each of the first column signal lines L101 is electrically connected to the terminal 44.

Reference numeral 27 denotes a constant current supply MOS transistor 27. A voltage is provided from a terminal 35 to the gate of the MOS transistor (constant current source) 27 to make the transistor operate as a constant current source. Reference numeral 42 denotes an output terminal which is placed between the power supply line L103 and the constant current source 27. The output terminal 42 outputs a differential signal to the output buffer unit 228.

The differential amplifier 24 receives a signal from the pixel 1 via the input terminal 26 and a reference signal via the terminal 25, and generates a differential signal by amplifying the difference between the signal from the pixel 1 and the reference signal. The differential amplifier 24 outputs the differential signal via the output terminal 42.

The feedback unit 41 includes the following constituent elements.

Reference numeral 32 denotes a MOS transistor for switching the output terminal 29 of the output buffer unit 228 and the (−) input terminal 26 of the differential amplifier 24. A control pulse is applied from a terminal 36 to the gate of the MOS transistor 32 to turn on/off the transistor at a predetermined timing. Reference numeral 34 denotes a capacitor having one electrode electrically connected to the (−) input terminal 26 and the other electrode electrically connected to the output buffer unit 228.

When the pixel 1 outputs a reset signal, the column amplification unit 206 turns on the MOS transistor 32 of the feedback unit 41 to make it operate as a voltage follower. While the pixel 1 keeps outputting a reset signal, the column amplification unit 206 turns off the MOS transistor 32. With this operation, the potential of the output terminal 29 (to be described later) becomes the value obtained by adding the offset voltage of the column amplification unit 206 to the potential of the input terminal 25.

When the pixel 1 outputs an optical signal, the column amplification unit 206 operates while the MOS transistor 32 is off. When the column amplification unit 206 operates as an operational amplifier, its gain is determined by the capacitance division ratio between the capacitors 33 and 34. That is, letting C1 and C2 be the values of the capacitors 33 and 34, the gain is represented by −C1/C2.

Since reset noise in a pixel output is removed by clamping operation of the capacitor 33, noise to be removed by the differential amplifier 22 located downstream of the holding capacitors 7 and 8 is the offset variation of the column amplification unit 206 and reset noise (kTC noise) in the capacitors 33 and 34. Since the amplitude of an optical signal is amplified by C1/C2, a sensor output with a high signal-to-noise (SNS) ratio can be obtained by properly performing gain setting.

The output buffer unit 228 includes the following constituent elements.

Reference numeral 43 denotes an input terminal. The input terminal 43 is electrically connected to the output terminal 42. A differential signal is input from the differential amplifier 24 to the input terminal 43. Reference numeral 29 denotes an output terminal. The output terminal 29 is electrically connected to the second column signal line L102, placed between the power supply line L103 and a constant current source 30 (to be described later), and electrically insulated from the input terminal 43. The output terminal 29 is electrically connected to the source of a transistor Tr. The output terminal 29 outputs a signal (differential signal-threshold voltage of Tr) corresponding to a differential signal to the second column signal line L102.

Reference numeral 30 denotes a constant current supply MOS transistor (constant current source). A voltage is provided from the terminal 35 to the gate of the MOS transistor (constant current source) 30 to make the transistor operate as a constant current source. The transistor Tr functions as a source follower, together with the MOS transistor (constant current source) 30.

The output buffer unit 228 receives a differential signal via the input terminal 43, and outputs a signal corresponding to the differential signal to the second column signal line L102 via the output terminal 29.

A current limiting unit 237 is placed between the power supply line L103 and the output terminal 29. The current limiting unit 237 limits the flow of an excessive current from the power supply line L103 to the second column signal line L102. The current limiting unit 237 includes, for example, a transistor which operates in a saturation range. More specifically, the current limiting unit 237 includes, for example, a P-type MOS transistor. Reference numeral 238 denotes a potential supply terminal electrically connected to the gate of the P-type MOS transistor. The potential of the potential supply terminal 238 is set to limit a current flowing in the MOS transistor with a certain value.

Let VDS be the source-drain voltage of the P-type MOS transistor, VGS be the gate-source voltage, and VTH be a threshold voltage. In this case, a drain current ID characteristic with respect to the source-drain voltage VDS is represented by $$-VDS < -(VGS-VTH) \quad (1)$$

In a linear region in which the above inequality is satisfied, the drain current ID exhibits the characteristic represented by $$ID = K\{(VGS-VTH) \cdot VDS - VDS2/2\} \quad (2)$$

In a saturation range in which the following inequality is satisfied:

$$-VDS > -(VGS-VTH) \quad (3)$$

the drain current ID exhibits the characteristic represented by $$ID = K/2 \cdot (VGS-VTH)2 \quad (4)$$

In equations (2) and (4), K is a constant determined by the structure parameters of the P-type MOS transistor.

According to equation (2), when the current limiting unit (transistor) 237 operates in a linear region, the current ID increases with an increase in the voltage VDS. As a result, a current flowing into the transistor Tr cannot be limited.

In contrast, according to equation (4), when the current limiting unit (transistor) 237 operates in a saturation range, even if the voltage VDS increases, the current ID does not easily increase, thereby limiting a current flowing into the transistor Tr. That is, the potential supply terminal 238 provides a voltage to the current limiting unit (transistor) 237 so as to obtain the voltage VGS satisfying inequality (3).

Figure 3:
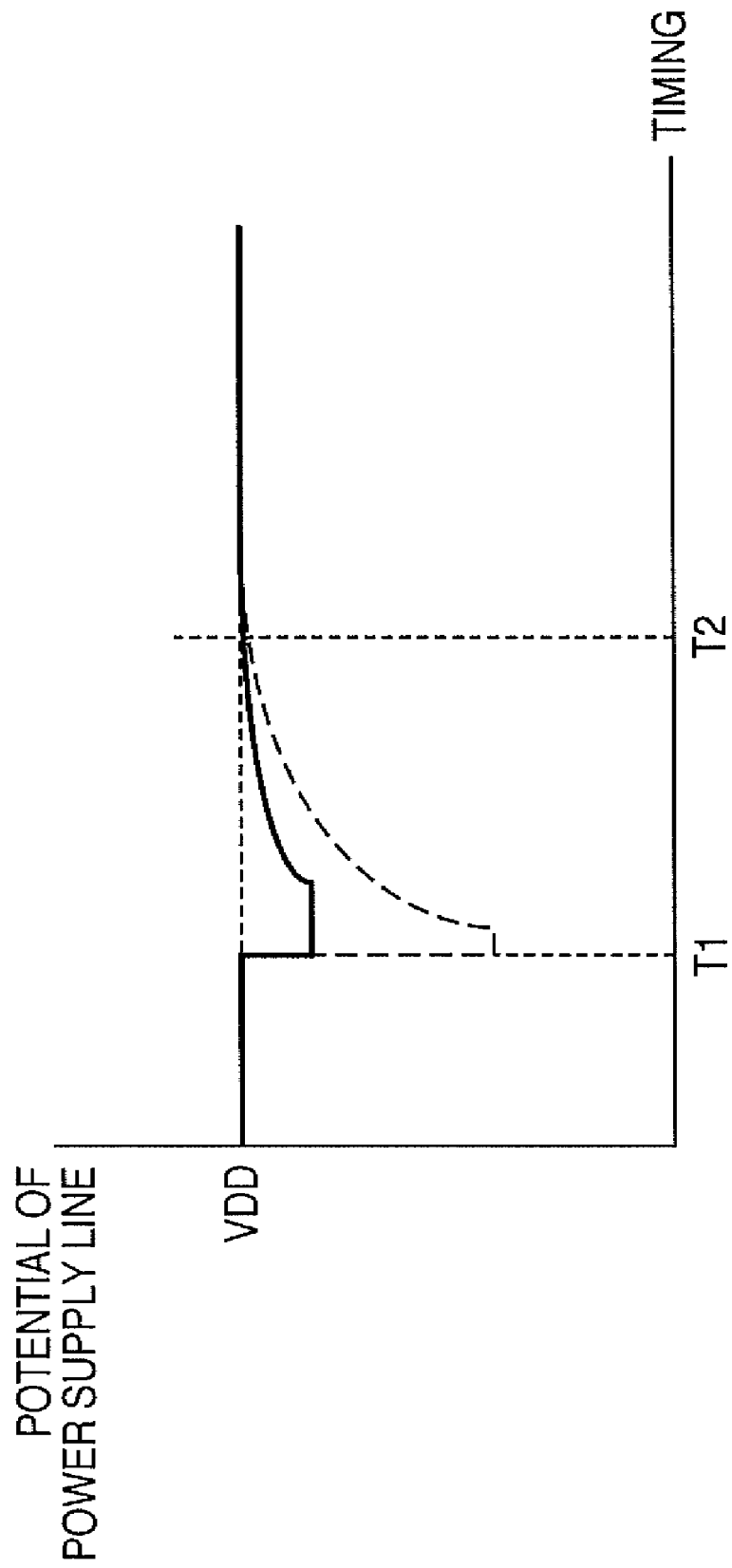
FIG. 3 is a timing chart showing changes in the potential of a power supply line.

Changes in the potential of the power supply line L103 will be described next with reference to FIG. 3. FIG. 3 is a timing chart showing changes in the potential of the power supply line L103.

Assume that the column amplification unit 206 does not include the current limiting unit 237. In this case, as indicated by the broken line in FIG. 3, the potential of the power supply line L103 changes. That is, when a high-level signal is input to the column amplification unit 206, the load of a current for charging the holding capacitors 7 and 8 of the readout circuit 5 electrically connected to the second column signal line L102 increases. Consequently, at a timing T1 at which the holding capacitors 7 and 8 start charging up, a large current (excessive current) flows between the source and drain of the transistor Tr of the output buffer unit 228 of the column amplification unit 206. For this reason, a large current (excessive current) also flows in the power supply line L103, and the potential of the power supply line L103 temporarily decreases due to the interconnection resistance of the power supply line L103. At a timing T2 at which the holding capacitors 7 and 8 finish charging up, the potential of the power supply line L103 is also lower than VDD.

In contrast, according to this embodiment, in the column amplification unit 206, the current limiting unit 237 limits the flow of an excessive current from the power supply line L103 to the second column signal line L102. With this operation, as indicated by the solid line in FIG. 3, the potential of the power supply line L103 changes. That is, when a high-level signal is input to the column amplification unit 206, the load of a current for charging the holding capacitors 7 and 8 increases. However, since the current limiting unit 237 limits the flow of an excessive current to the second column signal line L102, no large current (excessive current) flows between the source and drain of the transistor Tr of the output buffer unit 228 of the column amplification unit 206 at the timing T1 at which the holding capacitors 7 and 8 start charging up. Consequently, no large current (excessive current) flows in the power supply line L103, and a decrease in the potential of the power supply line L103 due to the interconnection resistance of the power supply line L103 is also suppressed. At the timing T2, the potential of the power supply line L103 has already returned to VDD.

As described above, according to this embodiment, although the column amplification unit 206 on the right column shares the power supply line L103 with the column amplification unit 206 on the left column (see FIG. 1), the column amplification unit 206 on the right column can output stable signals without being affected by the column amplification unit 206 on the left side. Assume that no light enters the pixel 1 on the right column, and high-luminance light enters the pixel 1 on the left column. In this case, when the column amplification unit 206 for the pixel 1 on the left column charges the holding capacitor 8 with a voltage corresponding to a white-level optical signal, a decrease in the potential of the power supply line L103 is suppressed. This makes it possible for the column amplification unit 206 on the right column to charge the holding capacitor 8 with a voltage corresponding to a black-level optical signal without being affected by the column amplification unit 206 for the pixel 1 on the left column. With this operation, a voltage corresponding to the white level is provided from the left column to the subsequent stage as an image signal $\Delta V$ as the difference between a reset signal and an optical signal, and a voltage corresponding to the black level is provided from the right column to the subsequent stage. This can reduce the occurrence of an alias (horizontal smear) in an area 45 horizontally adjacent o a high-brightness object 40 in an image corresponding to the obtained image signal (see FIG. 10).

Figure 4:
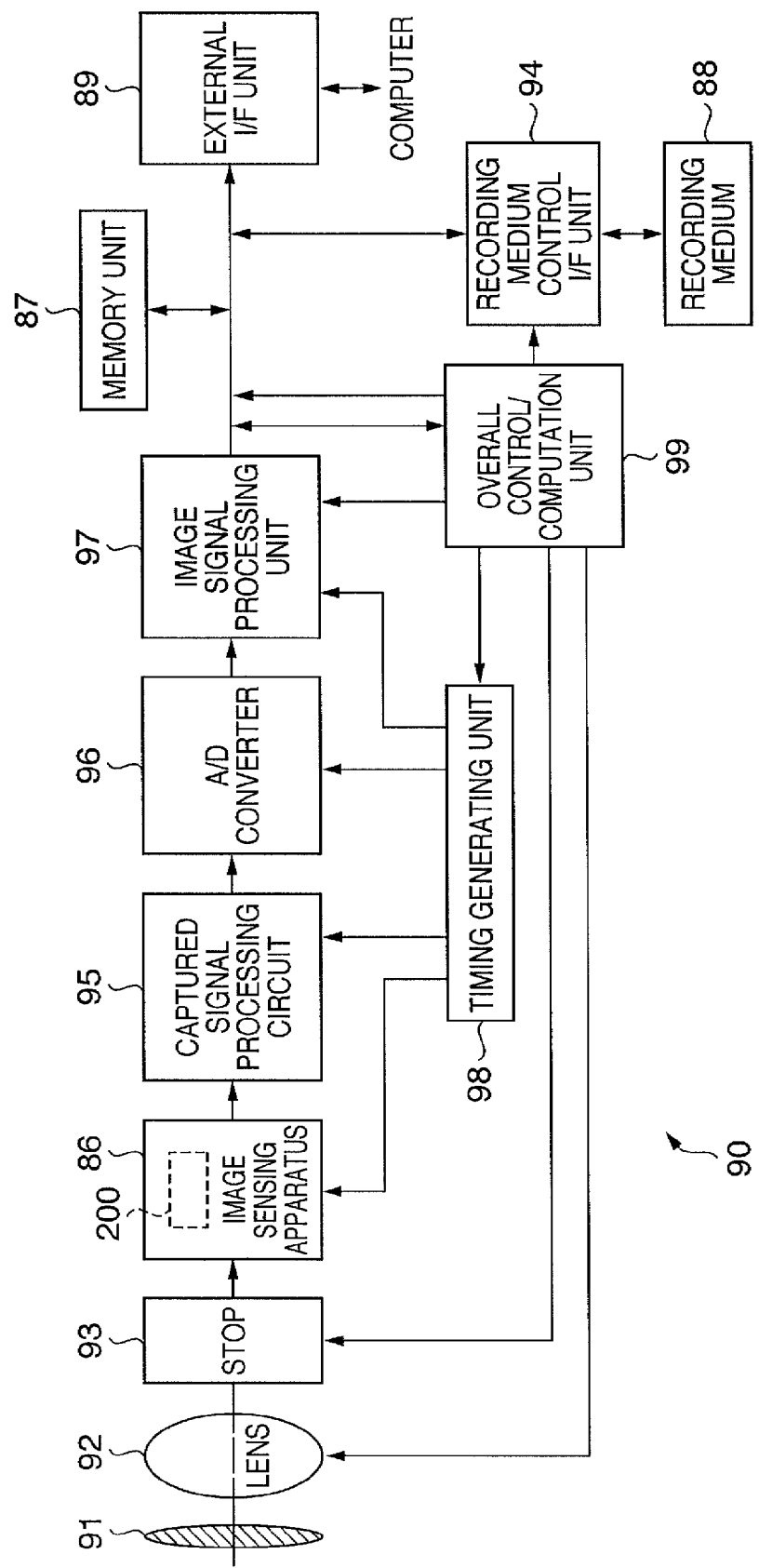
FIG. 4 is a block diagram showing the arrangement of an image capturing system to which the photoelectric conversion apparatus according to the first embodiment is applied.

FIG. 4 shows an example of an image capturing system to which the photoelectric conversion apparatus of the present invention is applied.

As shown in FIG. 4, an image capturing system 90 mainly comprises an optical system, image sensing apparatus 86, and signal processing unit. The optical system mainly comprises a shutter 91, taking lens 92, and stop 93. The image sensing apparatus 86 includes the photoelectric conversion apparatus 200. The signal processing unit mainly comprises a captured signal processing circuit 95, A/D converter 96, image signal processing unit 97, memory unit 87, external I/F unit 89, timing generating unit 98, overall control/computation unit 99, recording medium 88, and recording medium control I/F unit 94. Note that the signal processing unit may not include the recording medium 88.

The shutter 91 is provided in front of the taking lens 92 on the optical path to control exposure.

The taking lens 92 refracts incident light to form the light into an object image on the photoelectric conversion apparatus 200 of the image sensing apparatus 86.

The stop 93 is provided between the taking lens 92 and the photoelectric conversion apparatus 200 on the optical path to adjust the amount of light guided to the photoelectric conversion apparatus 200 via the taking lens 92.

The photoelectric conversion apparatus 200 of the image sensing apparatus 86 converts the object image formed on the photoelectric conversion apparatus 200 into an image signal. The image sensing apparatus 86 reads out the image signal from the photoelectric conversion apparatus 200 and outputs it.

The captured signal processing circuit 95 is electrically connected to the image sensing apparatus 86 and processes the image signal output from the image sensing apparatus 86.

The A/D converter 96 is electrically connected to the captured signal processing circuit 95, and converts the processed image signal (analog signal) output from the captured signal processing circuit 95 into a digital signal.

The image signal processing unit 97 is electrically connected to the A/D converter 96. The image signal processing unit 97 generates image data by performing computation processing such as various types of correction processing for the image signal (digital signal) output from the A/D converter 96. This image data is provided to the memory unit 87, external I/F unit 89, overall control/computation unit 99, recording medium control I/F unit 94, and the like.

The memory unit 87 is electrically connected to the image signal processing unit 97, and stores the image data output from the image signal processing unit 97.

The external I/F unit 89 is electrically connected to the image signal processing unit 97. With this arrangement, the image data output from the image signal processing unit 97 is transferred to an external device (a personal computer or the like) via the external I/F unit 89.

The timing generating unit 98 is electrically connected to the image sensing apparatus 86, captured signal processing circuit 95, A/D converter 96, and image signal processing unit 97. With this arrangement, the timing generating unit 98 provides a timing signal to the image sensing apparatus 86, captured signal processing circuit 95, A/D converter 96, and image signal processing unit 97. The image sensing apparatus 86, captured signal processing circuit 95, A/D converter 96, and image signal processing unit 97 then operate in synchronism with the timing signals.

The overall control/computation unit 99 is electrically connected to the timing generating unit 98, image signal processing unit 97, and recording medium control I/F unit 94. The overall control/computation unit 99 comprehensively controls the timing generating unit 98, image signal processing unit 97, and recording medium control I/F unit 94.

The recording medium 88 is detachably electrically connected to the recording medium control I/F unit 94. With this arrangement, the image data output from the image signal processing unit 97 is recorded on the recording medium 88 via the recording medium control I/F unit 94.

With the above arrangement, if the photoelectric conversion apparatus 200 can obtain a good image signal, good image (image data) can be obtained.

Figure 5:
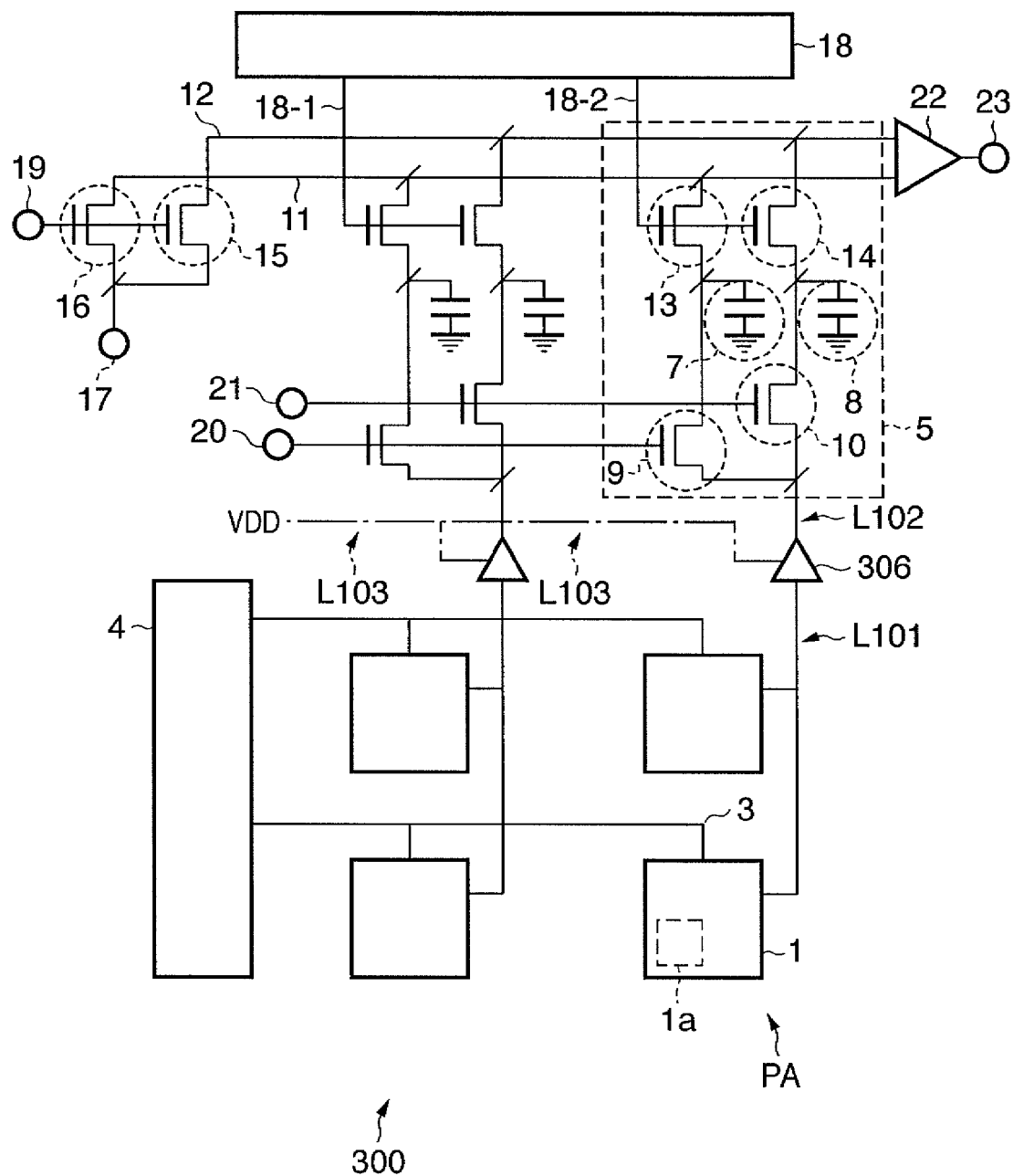
FIG. 5 is a diagram showing the arrangement of a photoelectric conversion apparatus according to the second embodiment of the present invention.
Figure 6:
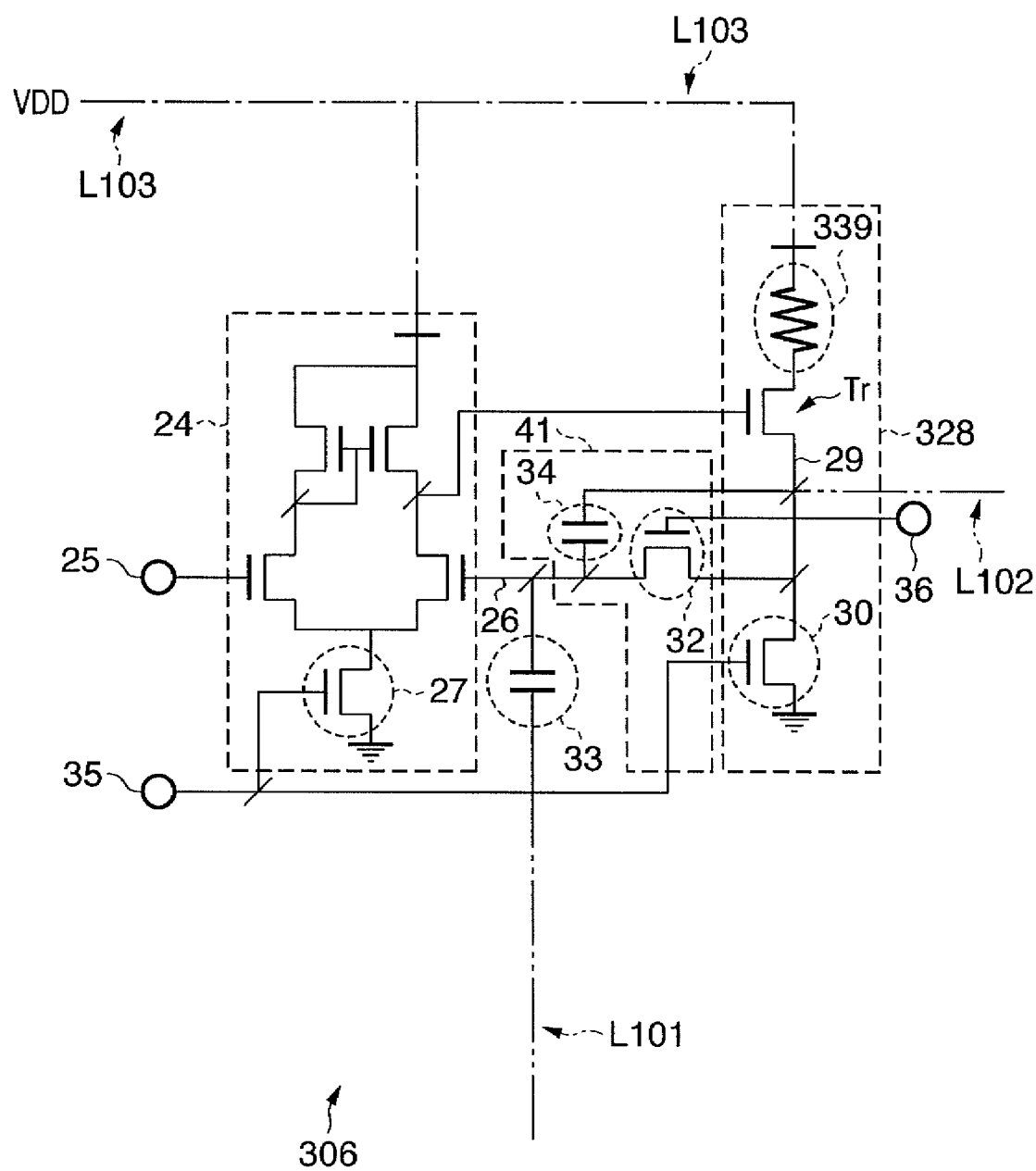
FIG. 6 is an equivalent circuit diagram showing the arrangement of a column amplification unit.
Figure 7:
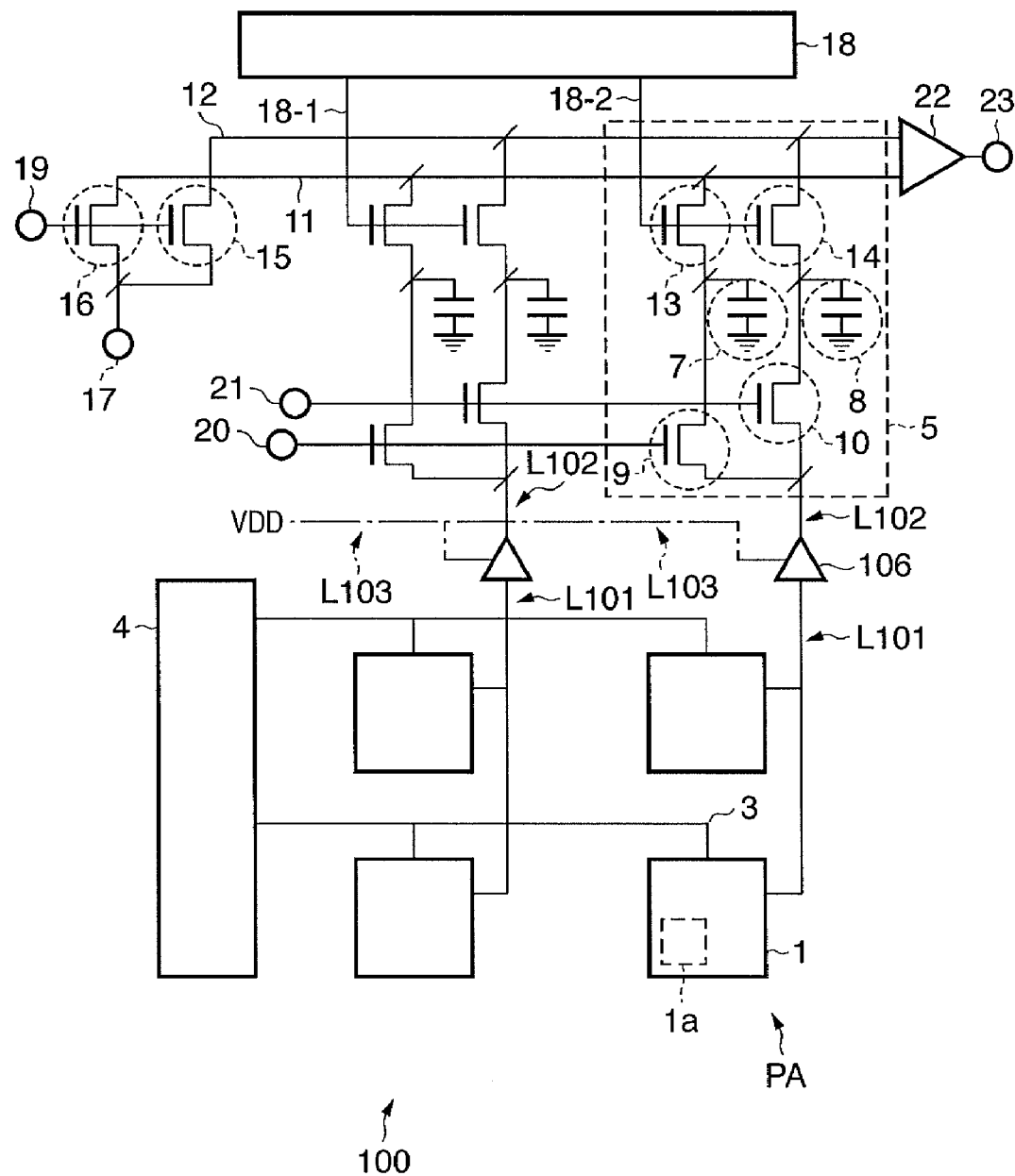
FIG. 7 is a diagram for explaining a problem to be solved by the present invention.
Figure 8:
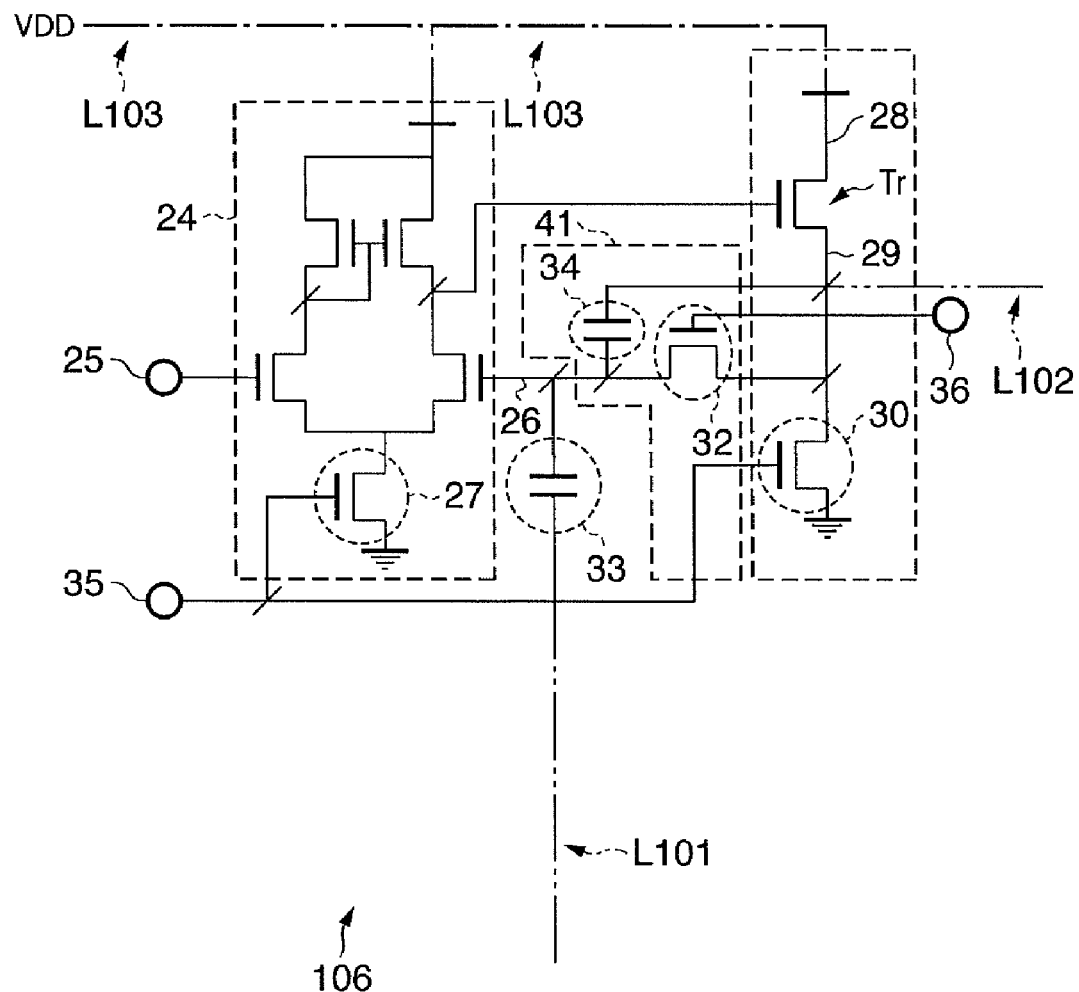
FIG. 8 is a circuit diagram for explaining the problem to be solved by the present invention.
Figure 9:
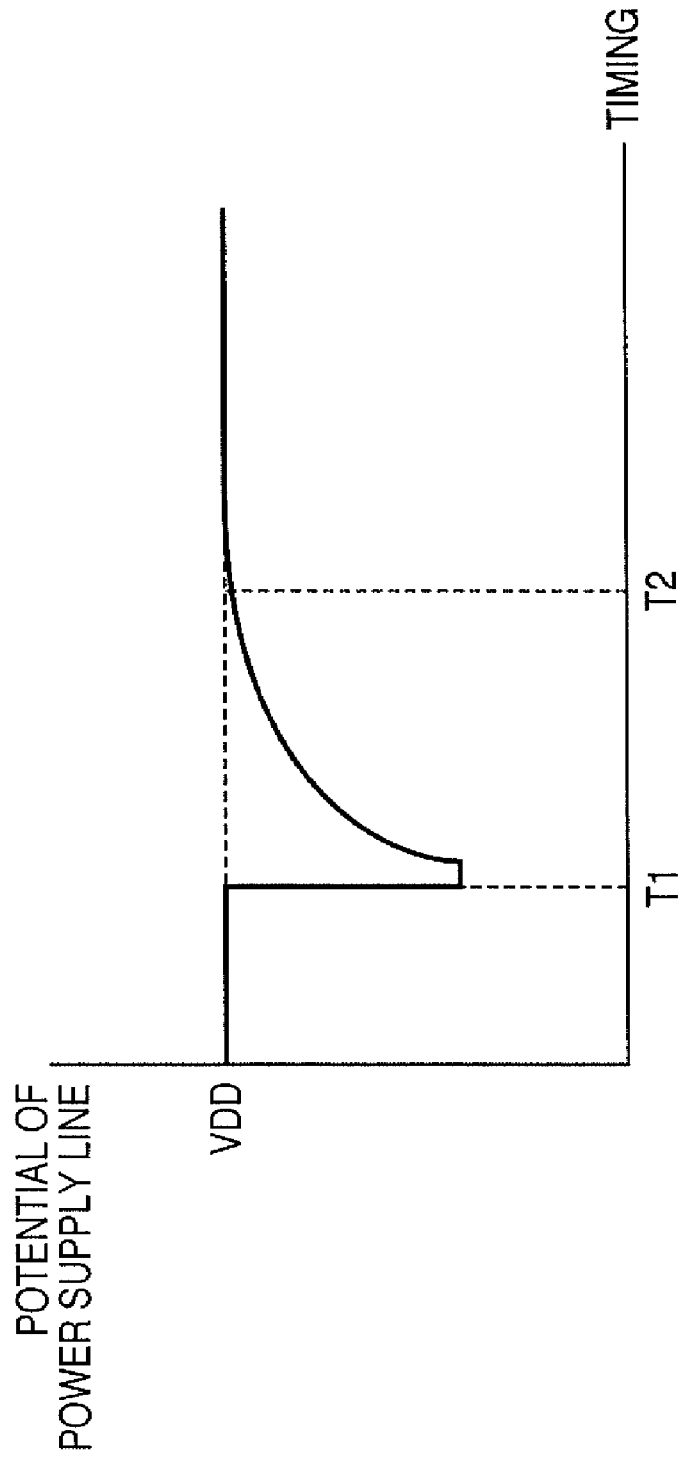
FIG. 9 is a timing chart for explaining the problem to be solved by the present invention.

A photoelectric conversion apparatus 300 according to the second embodiment of the present invention will be described with reference to FIGS. 5 and 6. FIG. 5 is a diagram showing the arrangement of the photoelectric conversion apparatus 300 according to the second embodiment of the present invention. FIG. 6 is an equivalent circuit diagram showing the arrangement of a column amplification unit 306.

As shown in FIG. 5, the basic arrangement of the photoelectric conversion apparatus 300 is the same as that in the first embodiment except that the apparatus 300 includes the column amplification unit 306.

As shown in FIG. 6, the column amplification unit 306 differs from that in the first embodiment in that it includes an output buffer unit 328. The output buffer unit 328 includes a current limiting unit 339.

The current limiting unit 339 limits the flow of an excessive current from a power supply line L103 to a second column signal line L102. The current limiting unit 339 includes, for example, a resistive element. This makes it possible to implement a current limiting unit with a simple arrangement.

Assume that the column amplification unit 306 does not include the current limiting unit 339. In this case, when a high-level signal is input to the column amplification unit 306, the load of a current for charging holding capacitors 7 and 8 of a readout circuit 5 electrically connected to the second column signal line L102 increases. As a result, a large current (excessive current) flows between the drain and source of a transistor Tr of the output buffer unit 328, and hence a large current (excessive current) also flows in the power supply line L103.

In contrast to this, in this embodiment, when a high-level signal is input to the column amplification unit 306, the load of a current for charting the holding capacitors 7 and 8 increases. The current limiting unit 339 limits the flow of an excessive current to the second column signal line L102. For this reason, at a timing T1 at which the holding capacitors 7 and 8 start charging up, no large current (excessive current) flows between the source and drain the transistor Tr of the output buffer unit 328 of the column amplification unit 306. As a consequence, no large current (excessive current) flows in a power supply line L103, and hence a decrease in the potential of the power supply line L103 due to the interconnection resistance of the power supply line L103 is also suppressed. At a timing T2, the potential of the power supply line L103 has almost returned to VDD.

As described above, in this embodiment as well, even if the column amplification unit 306 on the right column shares the power supply line L103 with the column amplification unit 306 on the left column (see FIG. 5), the column amplification unit 306 on the right column can output stable signals without being affected by the column amplification unit 306 on the left column. Assume that no light enters the pixel 1 on the right column, and high-luminance light enters the pixel 1 on the left column. In this case, when the column amplification unit 306 for the pixel on the left column charges the holding capacitor 8 with a voltage corresponding to a white-level optical signal, a decrease in the potential of the power supply line L103 is suppressed. This allows the column amplification unit 306 on the right column to charge the holding capacitor 8 with a voltage corresponding to a black-level optical signal without being affected by the column amplification unit 306 for the pixel 1 on the left column. Consequently, a voltage corresponding to the white level is provided from the left column to the subsequent stage as an image signal ΔV which is the difference between a reset signal and an optical signal, and a voltage corresponding to the black level is provided from the right column to the subsequent stage. This can reduce the occurrence of an alias (horizontal smear) in an area 45 horizontally adjacent to a high-brightness object 40 in an image corresponding to the obtained image signal (see FIG. 10).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-104213, filed Apr. 11, 2007, which is hereby incorporated by reference herein in its entirety.

What is claimed is:

1. A photoelectric conversion apparatus comprising:
   a pixel array in which pixels including photoelectric conversion units are arrayed in a row direction and a column direction;
   a plurality of first column signal lines, which are electrically connected to pixels arrayed in the pixel array in the column direction, respectively;
   a plurality of column amplification units, which amplify signals provided via the plurality of first column signal lines, respectively;
   a power supply line, which provides a power supply voltage to each of the plurality of column amplification units; and a plurality of second column signal lines, which are electrically connected to output sides of the plurality of column amplification units, respectively, wherein each of the plurality of column amplification units include an output buffer with a current limiting unit that limits flow of an excessive current to each of the plurality of second column signal lines, and wherein each of the current limiting units is arranged between the power supply line and an output terminal of a corresponding output buffer electrically connected to a corresponding second column signal line, respectively.

2. The apparatus according to claim 1, wherein each of the plurality of column amplification units includes a differential amplifier, which generates a differential signal by amplifying a difference between a signal provided via a corresponding first column signal line and a reference signal.

3. The apparatus according to claim 1, wherein
each output buffer unit includes a source follower, and
each current limiting unit includes a transistor that operates in a saturation range.

4. The apparatus according to claim 1, wherein
each output buffer unit includes a source follower, and
each current limiting unit includes a resistive element.

5. A photoelectric conversion apparatus according to claim 1, wherein the photoelectric conversion apparatus is incorporated in an image capturing system that includes:

an optical system, which forms light into an image on the photoelectric conversion apparatus; and a signal processing unit, which generates image data by processing a signal output from the photoelectric conversion apparatus.

* * * * *